US007699629B2

(12) United States Patent
Sasser et al.

(10) Patent No.: US 7,699,629 B2
(45) Date of Patent: Apr. 20, 2010

(54) GROUNDING VIA A PIVOT LEVER IN A TRANSCEIVER MODULE

(75) Inventors: Gary D. Sasser, San Jose, CA (US); Chris Togami, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 220 days.

(21) Appl. No.: 11/688,753

(22) Filed: Mar. 20, 2007

(65) Prior Publication Data

US 2007/0224859 A1 Sep. 27, 2007

Related U.S. Application Data

(60) Provisional application No. 60/784,352, filed on Mar. 21, 2006.

(51) Int. Cl.
*H01R 13/648* (2006.01)
*H01R 13/00* (2006.01)

(52) U.S. Cl. ............................... 439/108; 439/484

(58) Field of Classification Search .......... 439/484, 439/160, 108
See application file for complete search history.

(56) References Cited

U.S. PATENT DOCUMENTS

| 4,110,585 | A | 8/1978 | Brown |
| 5,321,372 | A | 6/1994 | Smith |
| 5,838,550 | A | 11/1998 | Morris et al. |
| 5,907,569 | A | 5/1999 | Glance et al. |
| 6,335,869 | B1 | 1/2002 | Branch et al. |
| 6,439,918 | B1 | 8/2002 | Togami et al. |
| 6,459,517 | B1 | 10/2002 | Duncan et al. |
| 6,533,603 | B1 | 3/2003 | Togami |
| 6,705,879 | B2 | 3/2004 | Engel et al. |
| 6,817,782 | B2 | 11/2004 | Togami et al. |
| 6,890,206 | B2 * | 5/2005 | Distad et al. ............ 439/372 |
| 6,953,289 | B2 | 10/2005 | Togami et al. |
| 2004/0161958 | A1 * | 8/2004 | Togami et al. .......... 439/160 |
| 2005/0170695 | A1 | 8/2005 | Togami et al. |
| 2005/0196119 | A1 | 9/2005 | Popovic et al. |

OTHER PUBLICATIONS

Small Form-factor Pluggable (SFP) Transceiver Multisource Agreemenet (MSA), Cooperation Agreement for Small-Form-factor Pluggable Transceivers, Agilent Technologies, et al., Sep. 14, 2000.
Sasser et al., Grounding a Printed Circuit Board in a Transceiver Module, U.S. Appl. No. 11/689,351, filed Mar. 21, 2007.

(Continued)

*Primary Examiner*—Briggitte R Hammond
(74) *Attorney, Agent, or Firm*—Workman Nydegger

(57) ABSTRACT

A transceiver module that utilizes a pivot lever to ground a shielded cable that is plugged into the transceiver module. In one example embodiment, a transceiver module includes a housing, a jack, and a movable pivot lever. The housing is operative to be electrically connected to chassis ground when the transceiver module is received within a host port. The jack is defined in the housing and operative to receive a shielded plug. The pivot lever is configured to allow removal of the transceiver module from within the host port. Further, the pivot lever is configured to be in electrical contact with both the housing and a conductive element of the shielded plug received by the jack such that a chassis ground is established between the housing and the shielded plug.

18 Claims, 5 Drawing Sheets

OTHER PUBLICATIONS

Togami et al., Electromagnetic Interference Containment in a Transceiver Module, U.S. Appl. No. 11/689,379, filed Mar. 21, 2007.

Engel et al., Connector Structure for a Transceiver Module, U.S. Appl. No. 11/689,403, filed Mar. 21, 2007.

* cited by examiner

GROUNDING VIA A PIVOT LEVER IN A TRANSCEIVER MODULE

CROSS-REFERENCE TO RELATED APPLICATIONS

This application claims priority to U.S. Provisional Patent Application Ser. No. 60/784,352, filed on Mar. 21, 2006, which is incorporated herein by reference in its entirety.

BACKGROUND OF THE INVENTION

1. The Field of the Invention

The present invention relates generally to transceiver modules. More particularly, embodiments of the invention relate to a pivot lever configured to establish a grounded connection with a shielded cable that is plugged into a transceiver module.

2. The Related Technology

Communication modules, such as copper transceiver modules, often include a jack that can receive a corresponding plug. Examples of jack and plug configurations include, but are not limited to, jacks and plugs compliant with registered jack ("RJ") standards such as RJ-11, RJ-14, RJ-25, RJ-45, RJ-48, and RJ-61 standards. The RJ-45 standard is commonly used in conjunction with copper communications cables. Examples of copper communications cables include, but are not limited to, Category 5 ("CAT-5") cables, CAT-5e cables, and CAT-6 cables.

Copper communications cables can also be shielded. A shielded copper communications cable can be used in environments where there exists a need to eliminate interference from other electronic sources in order to enable clear signal transmission. Shielded copper communications cables typically terminate with a shielded plug. A shielded plug includes one or more exposed grounding electrical conductors. These exposed grounding electrical conductors are configured to be electrically grounded to chassis ground when inserted into a jack of a copper transceiver module.

One challenge with shielded plugs involves providing a reliable chassis ground contact for the shielded plug within the jack of the transceiver module. In particular, plugs and jacks are subject to wear and tear over time due to friction between plugs and jacks as the plugs are inserted into and removed from the jacks. This wear and tear can cause the exposed grounding electrical conductors of a shielded plug to become damaged. Likewise, such wear and tear can cause corresponding chassis-grounded electrical conductors of a jack to become damaged. This damage to the grounding electrical conductors of a shielded plug and/or jack can cause the chassis ground connection provided to the shielded plug to degrade into an intermittent and/or unreliable connection.

Plugs and jacks also occasionally suffer from mutual dimensional variations. For example, a particular plug may have a width that is slightly less than the standard width and a particular jack may have a width that is slightly greater than the standard width. In this example, when this plug is inserted into this jack, grounding electrical conductors on the outside sides of the plug and chassis-grounded electrical conductors on the inside sides of the jack may make only intermittent and/or unreliable mutual electrical contact, which can cause the chassis ground provided to the shielded plug to be intermittent and/or unreliable.

In light of the above discussion, a need currently exists for a transceiver module that is configured to provide a grounded connection with a shielded cable that is plugged into the transceiver module. In particular, there is a need for a transceiver module that is configured to provide a constant and reliable grounded connection with a shielded cable that is plugged into the transceiver module, thereby ensuring proper operation of the transceiver module.

BRIEF SUMMARY OF SOME EXAMPLE EMBODIMENTS

In general, embodiments of the invention are concerned with a transceiver module, such as a copper transceiver module, that utilizes a pivot lever to ground a shielded cable that is plugged into the transceiver module.

In one example embodiment, a transceiver module includes a housing, a jack, and a movable pivot lever. The housing is operative to be electrically connected to chassis ground when the transceiver module is received within a host port. The jack is defined in the housing and operative to receive a shielded plug. The movable pivot lever is operatively connected to a locking member. The pivot lever is configured to allow removal of the transceiver module from within the host port. Also, movement of the pivot lever manipulates the locking member in a manner so as to enable the transceiver module to be removed from within the host port. Further, the pivot lever is configured to be in electrical contact with both the housing and a conductive element of the shielded plug received by the jack such that a chassis ground is established between the housing and the shielded plug.

In another example embodiment, a transceiver module includes a housing, a jack, and a wire bail. The housing includes electrically conductive material. The jack is defined in the housing and is configured to receive a shielded plug. The wire bail is at least partially enclosed in the housing. Also, the wire bail is further configured to electrically connect with the housing and the shielded plug that is received within the jack.

In yet another example embodiment, a transceiver module includes a housing, a jack, and a latch mechanism. The housing includes electrically conductive material. The jack is defined in the housing and is configured to receive a shielded plug. The latch mechanism is at least partially enclosed within the housing. In this example embodiment, the latch mechanism includes a mounting plate electrically connected to the housing, a pivot block pivotally and electrically connected to the mounting plate, and a wire bail operatively and electrically connected to the pivot plate. Also, the wire bail is configured to electrically connect with the shielded plug that is received within the jack.

These and other aspects of example embodiments of the present invention will become more fully apparent from the following description and appended claims.

BRIEF DESCRIPTION OF THE DRAWINGS

To further clarify aspects of the present invention, a more particular description of the invention will be rendered by reference to specific embodiments thereof which are disclosed in the appended drawings. It is appreciated that these drawings depict only example embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Example embodiments of the present invention relate to a transceiver module, such as a copper transceiver module, that utilizes a pivot lever to ground a shielded cable that is plugged into the transceiver module. While described in the context of copper transceiver modules used in the field of communications networking, it will be appreciated that example embodiments of the present invention are applicable to other applications as well. For example, other types of transceiver modules, both electronic and opto-electronic, could utilize embodiments of the wire bail latch for providing a reliable ground to a shielded plug of a shielded cable.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

In the following description, numerous specific details are set forth in order to provide a thorough understanding of example embodiments of the present invention. It will be obvious, however, to one skilled in the art that the example embodiments of the present invention may be practiced without these specific details. In other instances, well-known aspects of transceiver modules have not been described in great detail in order to avoid unnecessarily obscuring the example embodiments of the present invention.

I. Example Transceiver Module

Figure 1:
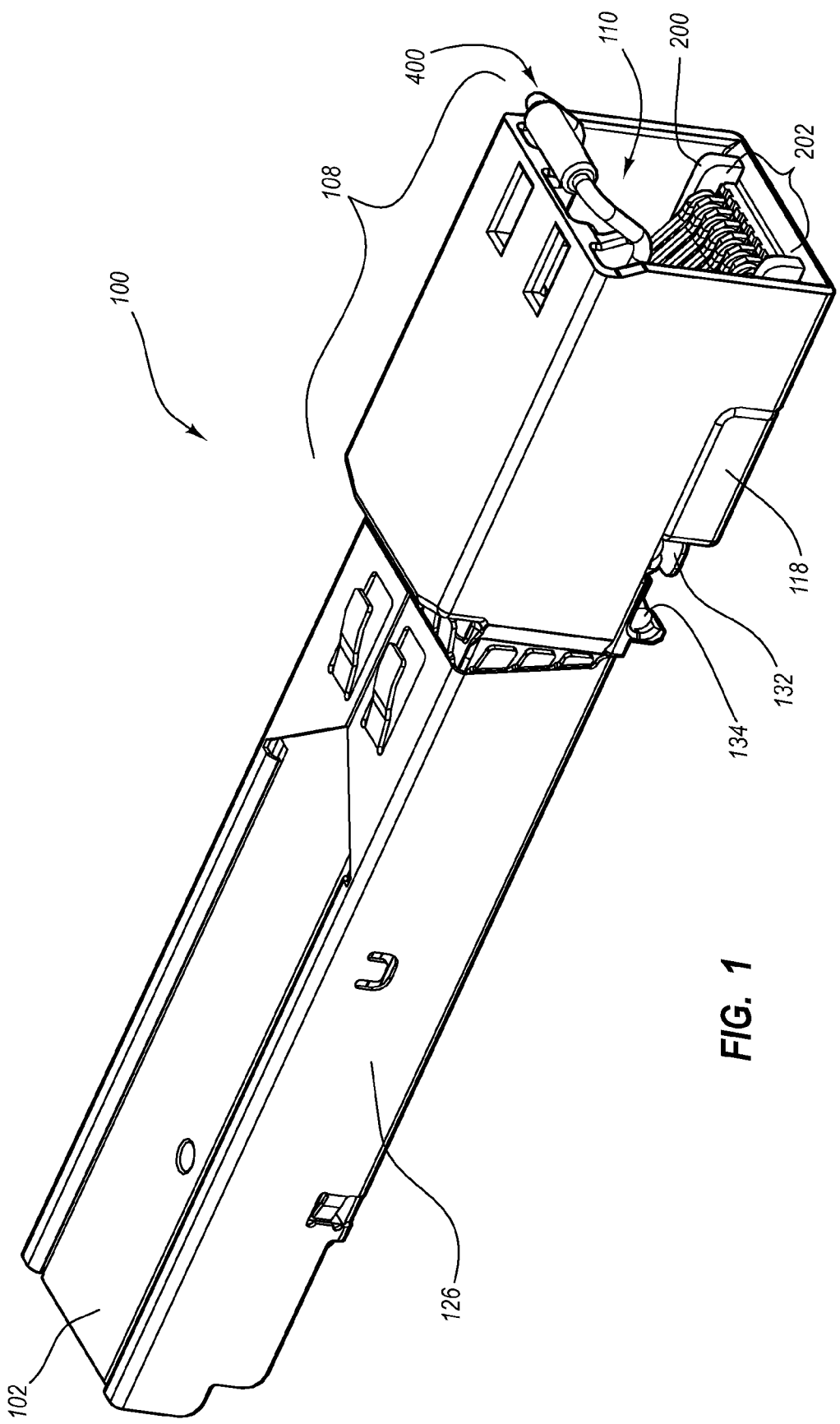
FIG. 1 is a perspective view of one example embodiment of an assembled transceiver module.
Figure 2:
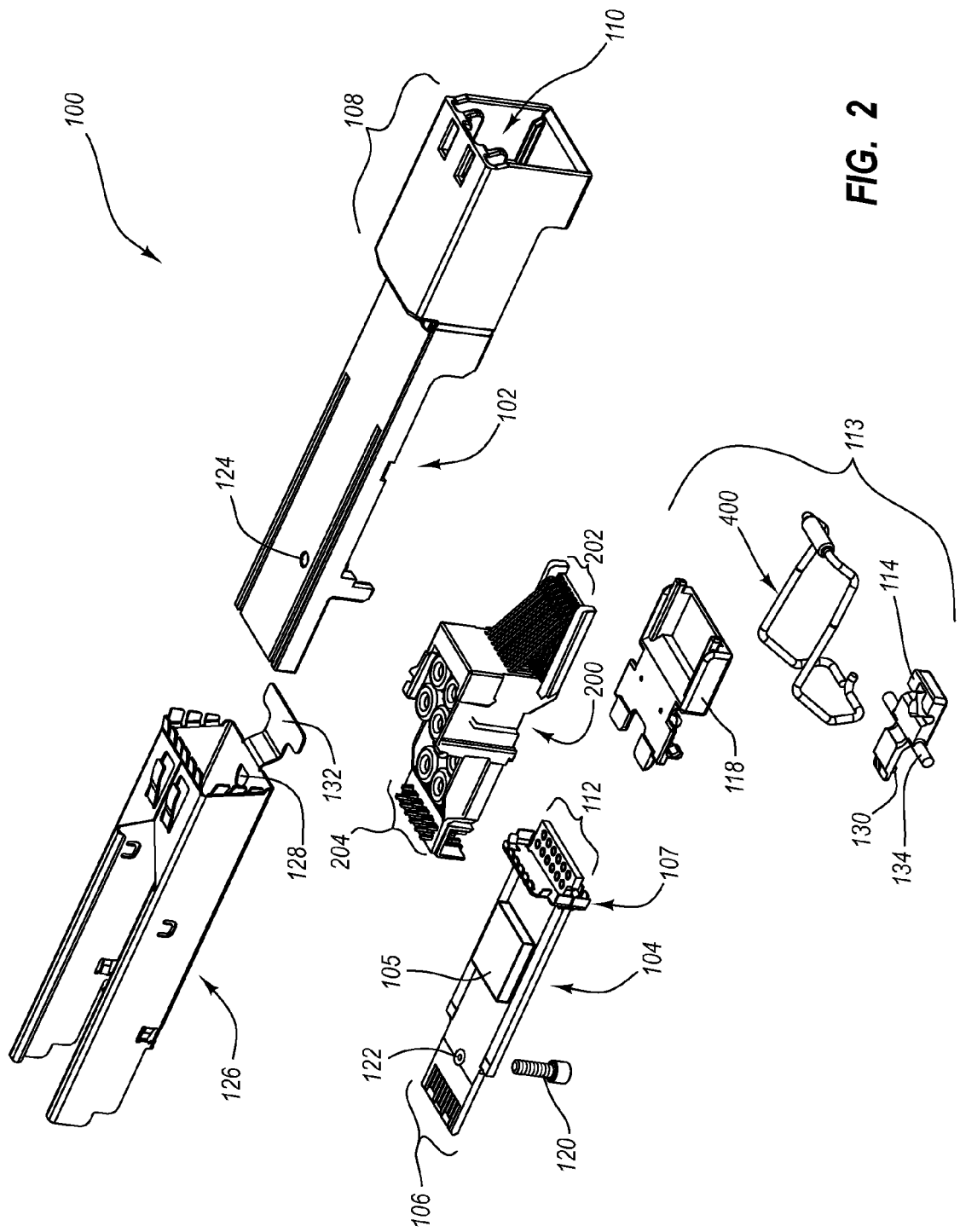
FIG. 2 is an exploded perspective view of the transceiver module of FIG. 1.

Reference is first made to FIGS. 1 and 2 together, which disclose perspective views of one example embodiment of a copper transceiver module, designated generally at 100. The transceiver module 100 has a low profile and substantially complies with existing industry standards, including transceiver module form factor, specified in the Small Form-factor Pluggable (SFP) Transceiver MultiSource Agreement (MSA). The transceiver module 100 achieves data rates of 1.25 Gb/s, supports the 1000Base-T transmission standard (also known as the IEEE 802.3ab standard), operates between about −40° C. and about 85° C., and is pluggable. Aspects of example embodiments of the present invention can be implemented in transceiver modules having other data rates, transmission standards, and/or operating temperatures. Likewise, aspects of example embodiments of the present invention can be implemented in transceiver or other communication modules that are not pluggable.

In the disclosed example, the transceiver module 100 includes an elongated base, designated generally at 102, that is configured to support and retain a first printed circuit board 104. In this example, the printed circuit board 104 accommodates various electronic components 105 positioned thereon, and it can include differing components and circuitry configurations, depending on the type of transceiver module in which it is implemented. Also formed on the printed circuit board 104 at a rear end is an exposed edge connector 106. The edge connector 106 is configured to be electrically compatible with a corresponding electrical connector (not shown) that is positioned within the port of a host device (not shown). Other connector schemes that are well known in the art could also be used in the transceiver module 100. In addition, as disclosed in FIG. 2, the transceiver module 100 includes an EMI shield 107 that is configured so as to circumscribe a portion of the printed circuit board 104.

In the disclosed example embodiment, a connector portion, designated generally at 108, is positioned at one end of the base 102 of the transceiver module 100. The connector portion 108 defines an RJ-45 jack 110 that is configured to operatively receive a corresponding RJ-45 plug, such as the RJ-45 plug shown in FIGS. 3A and 3B. Other examples of jack and plug configurations include, but are not limited to, jacks and plugs compliant with registered jack ("RJ") standards such as RJ-11, RJ-14, RJ-25, RJ-48, and RJ-61 standards. The RJ-45 standard is commonly used in conjunction with copper communications cables. Examples of copper communications cables include, but are not limited to, Category 5 ("CAT-5") cables, CAT-5e cables, and CAT-6 cables. It will be appreciated that the jack 110 could be implemented to accommodate any one of a number of different connector configurations, depending on the particular application involved.

The transceiver module 100 further includes a connector structure 200. The connector structure 200 fits within the connector portion 108 of the base 102. The connector structure 200 includes a first plurality of conductive elements 202 that are configured to make electrical connection to a corresponding plurality of electrical elements on an RJ-45 plug when the RJ-45 plug is inserted into the RJ-45 jack 110, as disclosed herein in connection with FIG. 5. The connector structure 200 also includes a second plurality of conductive elements 204 that are configured to electrically connect with a corresponding plurality of plated through holes 112 on the printed circuit board 104.

Figure 3B:
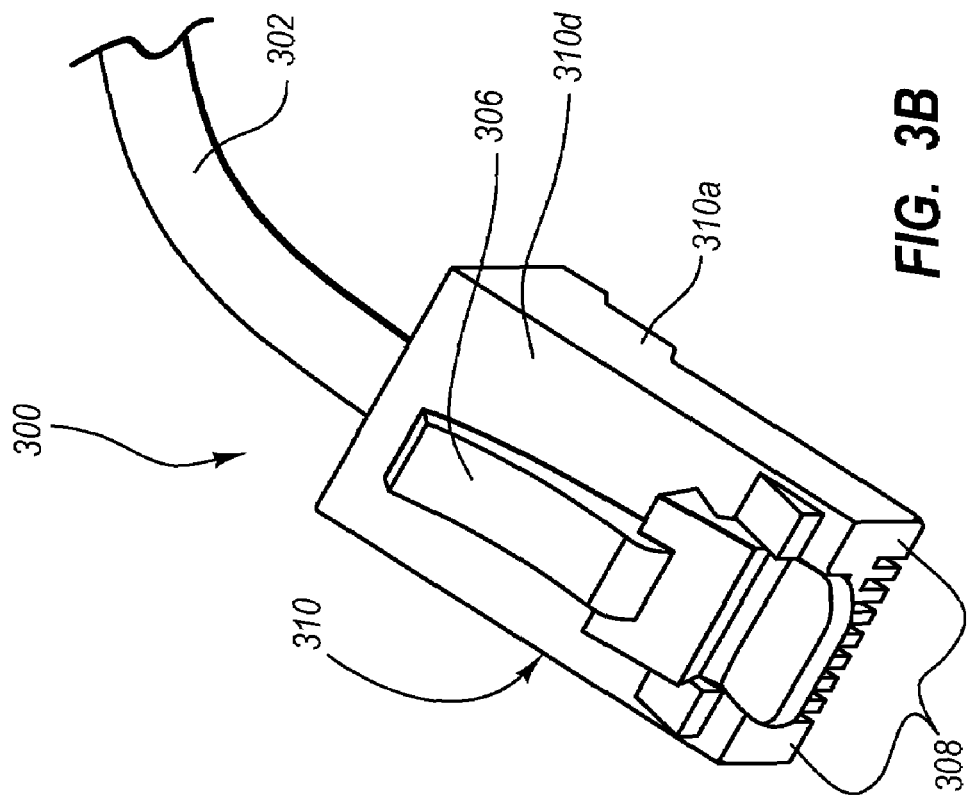
FIG. 3B is a top perspective view of the example shielded plug of FIG. 3A.
Figure 3A:
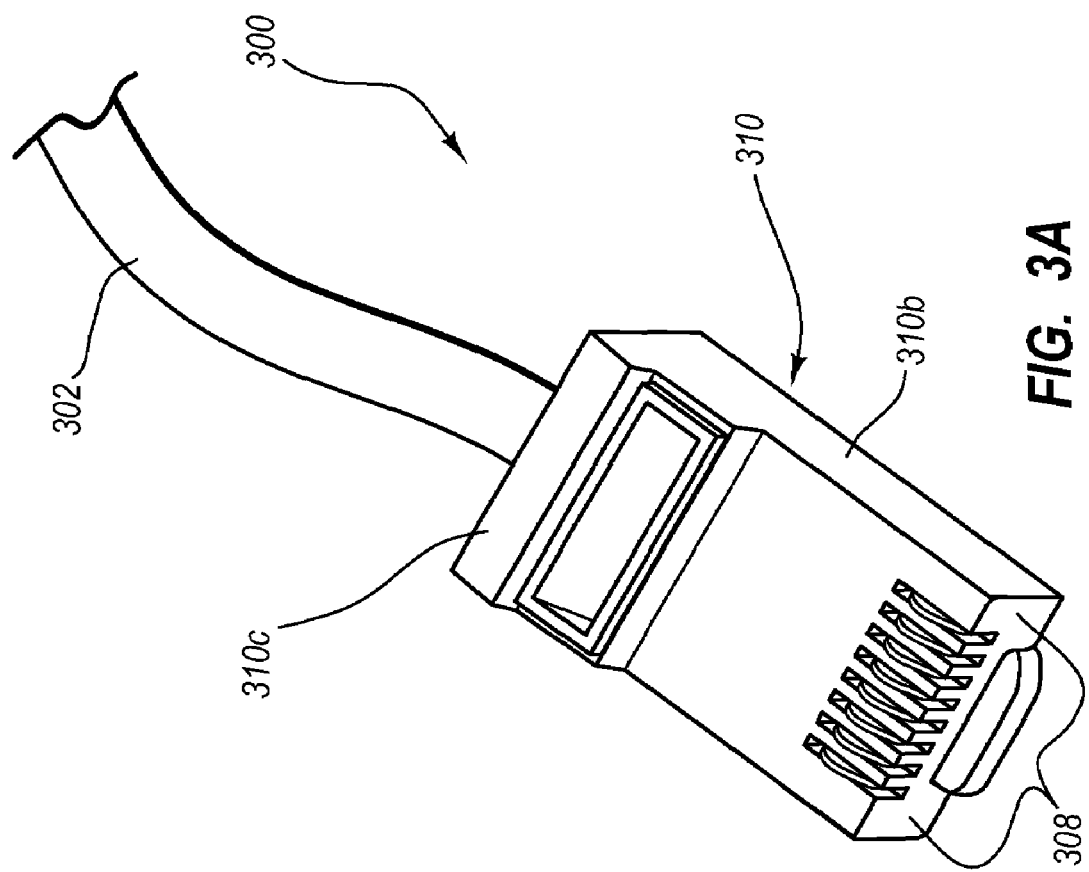
FIG. 3A is a bottom perspective view of an example shielded plug.

The transceiver module 100 also includes a latch mechanism 113, which is made up of a pivot block 114, a bail 400, and a mounting plate 118. In one example embodiment, the latch mechanism 113 provides several functions. First, the latch mechanism 113 provides a mechanism for "latching" the transceiver module 100 within a host port (not shown) when the transceiver module 100 is operatively received within the host port. Moreover, the latch mechanism 113 also provides a convenient means for extracting the transceiver module 100 from the host port, without the need for a special extraction tool. The latch mechanism 113 is preferably implemented so as to substantially preserve the small form factor of the transceiver module 100 in accordance with prevailing standards, and in a manner that allows convenient insertion and extraction of the transceiver module 100 from a host port without disturbing adjacent transceiver modules or adjacent copper communications cables—even when used in a host having a high port density. Also, in an example embodiment, the latch mechanism 113 precludes inadvertent extraction of the transceiver module 100 from the host port when an RJ-45 plug, such as the plug disclosed herein in connection with FIGS. 3A and 3B, is operatively received within or removed from the RJ-45 jack 110.

The mounting plate 118 includes mounting and pivot components for use in operatively interconnecting the pivot block 114, the bail 400 and the transceiver module 100. The function of the pivot block 114 and the bail 400 with respect to the mounting plate 118 within the transceiver module 100 is substantially similar to the function and operation of a pivot block 310 and a bail 308 with respect to a mounting plate 314 within a module 300 as disclosed in connection with FIGS. 5 and 6 of U.S. Patent Application Publication No. "2004/0161958 A1" titled "Electronic Modules Having Integrated Lever-Activated Latching Mechanisms," published Aug. 19, 2004, which is incorporated herein by reference in its entirety. More particularly, the bail 400 functions as a pivot lever in its interaction with the pivot block 114 and the mounting plate 118.

FIGS. 1 and 2 disclose how the base 102 and the printed circuit board 104 are at least partially enclosed and retained within a housing, designated generally at 126. The housing 126 is generally rectangular in cross-sectional shape so as to accommodate the base 102. The housing 126 includes an opening at its rear end so as to expose the edge connector 106 and thereby permit it to be operatively received within a corresponding electrical connector slot (not shown) within a host port of a host device (not shown). In one example embodiment, the housing 126 is formed of a conductive material such as sheet metal.

In an example embodiment, the housing 126 is configured so as to accommodate the latch mechanism 113 of the transceiver module 100. For example, a bottom surface of the housing 126 includes a locking recess 128, which is sized and shaped to expose a lock pin 130 of the pivot block 114 when the latch mechanism 113 is assembled within the transceiver module 100 and is in a latched position. Also, the housing 126 includes a means for biasing the latch mechanism 113 to a latched position. By way of example, the biasing means can be a resilient metal portion of the housing 126 that is formed as a leaf spring 132. When the transceiver module 100 is operably assembled, the leaf spring 132 can be biased against a top surface of the pivot block 114 so as to operatively secure the pivot block 114 in its assembled position. Also, the biasing action can be applied so as to urge the pivot block 114 in a rotational direction about a pivot point 134 so as to expose the lock pin 130 through the locking recess 128, which corresponds to the transceiver module 100 being in a latched position.

In addition, as disclosed in FIGS. 1 and 2, after the connector structure 200 is operably connected to the printed circuit board 104 and operably assembled within the base 102, the mounting plate 118 partially encloses the connector structure 200 within the connector portion 108 of the base 102. The mounting plate 118 can be made from an electrically conductive material, as can the pivot block 114 and the base 102. Therefore, after the assembly of the transceiver module 100, when the base 102 is grounded, for example to chassis ground, the mounting plate 118 is also necessarily grounded because of the secure electrical attachment of the mounting plate 118 to the connector portion 108 of the base 102. In addition, because of the secure electrical attachment of the pivot block 114 to the mounting plate 118, the pivot block 114 is also necessarily grounded. Additionally, where the housing 126 is chassis-grounded, the biasing of the leaf spring 132 of the housing 126 against the pivot block 114 provides another grounding contact for the pivot block 114. The printed circuit board 104 is also secured to the base 102 with a fastener 120 which passes through an opening 122 in the printed circuit board 104 and into an opening 124 in the base 102.

II. Example Shielded Plug

Reference is now made to FIGS. 3A and 3B, which are a bottom perspective view and a top perspective view, respectively, of an example shielded plug 300. The shielded plug 300 is sized and configured to be inserted into the jack 110 disclosed in connection with FIG. 1. The shielded plug 300 is included at an end of a shielded cable 302, which as disclosed herein, can be any of, but is not limited to, a CAT-5 shielded cable, a CAT-5e shielded cable, or a CAT-6 shielded cable. The shielded plug 300 also includes a plastic clip 306. The clip 306 is configured to automatically lock the shielded plug 300 in place when the shielded plug 300 is inserted into the jack 110. Pressing down on the clip 306 when the shielded plug 300 is positioned within the jack 110 unlocks the shielded plug 300 from the jack 110 and enables the shielded plug 300 to be removed from the jack 110.

The shielded plug 300 also includes conductive elements 308. The conductive elements 308 of the shielded plug 300 correspond to the conductive elements 202 of the connector structure 200. When the shielded plug 300 is inserted into the jack 110, the conductive elements 308 of the shielded plug 300 are in electrical contact with the conductive elements 202 of the connector structure 200, thereby providing an electrical connection between the shielded cable 302 and the connector structure 200 over which electrical signals can travel.

The shielded plug 300 also includes an electrically conductive housing 310. The electrically conductive housing 310 is made up of several sections including side sections 310a and 310b, a bottom section 310c, and a top section 310d. Each of the sections 310a-310d of the electrically conductive housing 310 is in electrical contact with the other sections of the electrically conductive housing 310. The electrically conductive housing 310 is designed to make electrical contact with a corresponding chassis-grounded conductive element of the transceiver module 100 when the shielded plug 300 is inserted into the jack 110 of the transceiver module 100. In order for the shielded plug 300 and the shielded cable 302 to function properly, the electrical contact between the electrically conductive housing 310 and the corresponding chassis-grounded conductive element of the transceiver module 100 must be reliable and constant.

III. Example Grounded Wire Bail Latch

Figure 4:
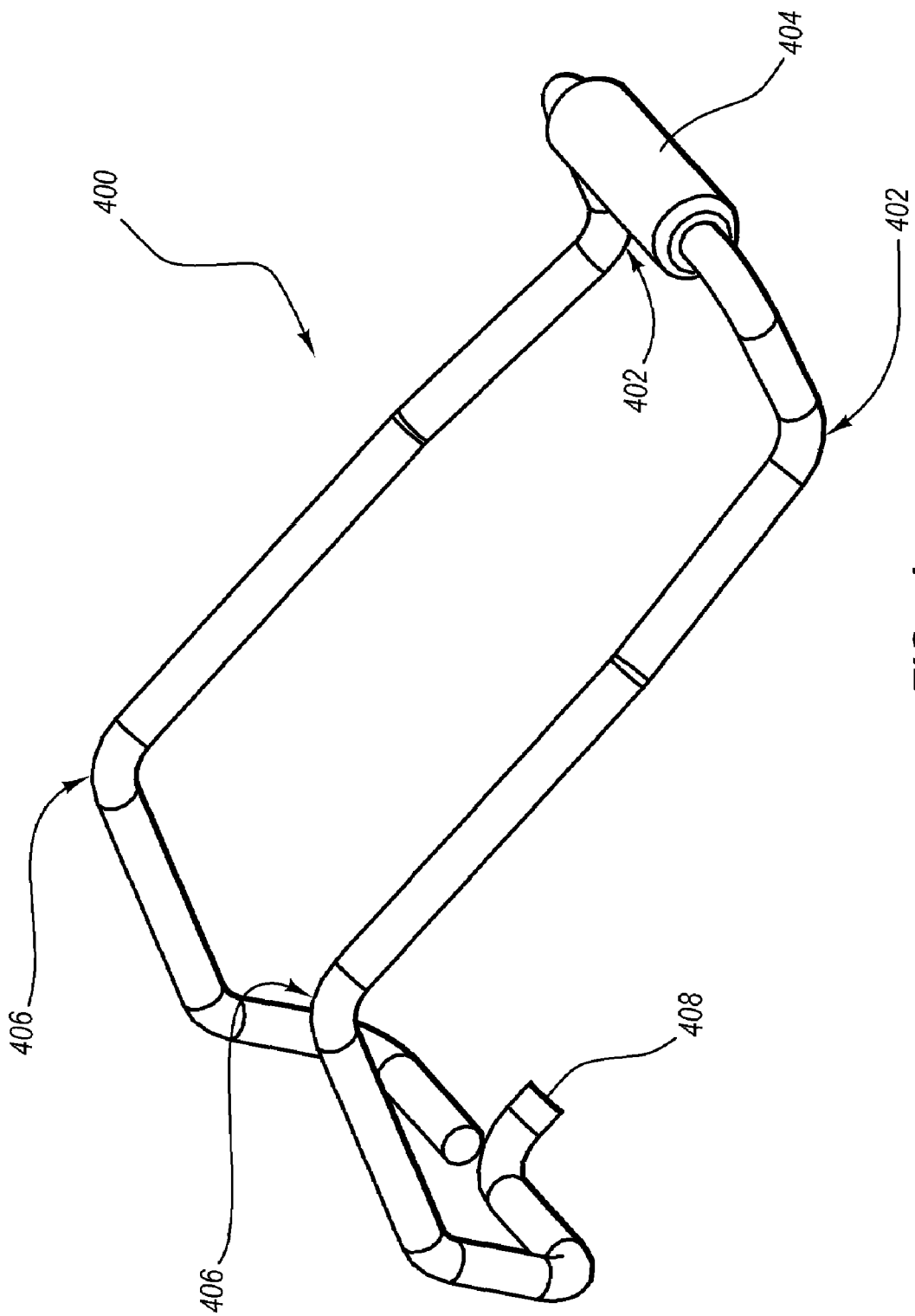
FIG. 4 is a perspective view of an example wire bail latch.

Reference is now made to FIG. 4, which discloses aspects of the bail 400 of FIGS. 1 and 2. As disclosed herein, the bail 400 can be assembled into the transceiver module 100 and can serve multiple functions. In addition to other functions disclosed herein, the bail 400 can function to provide a chassis ground contact to a shielded plug, such as the shielded plug 300 of FIGS. 3A and 3B, that is inserted into the jack 110. In detail, the bail 400 includes contact points 402 where the bail 400 is curved between a lever grip portion 404 and curved portions 406. The lever grip portion 404 of the bail 400 is suitable for grasping by a user's finger or other suitable device.

Figure 5:
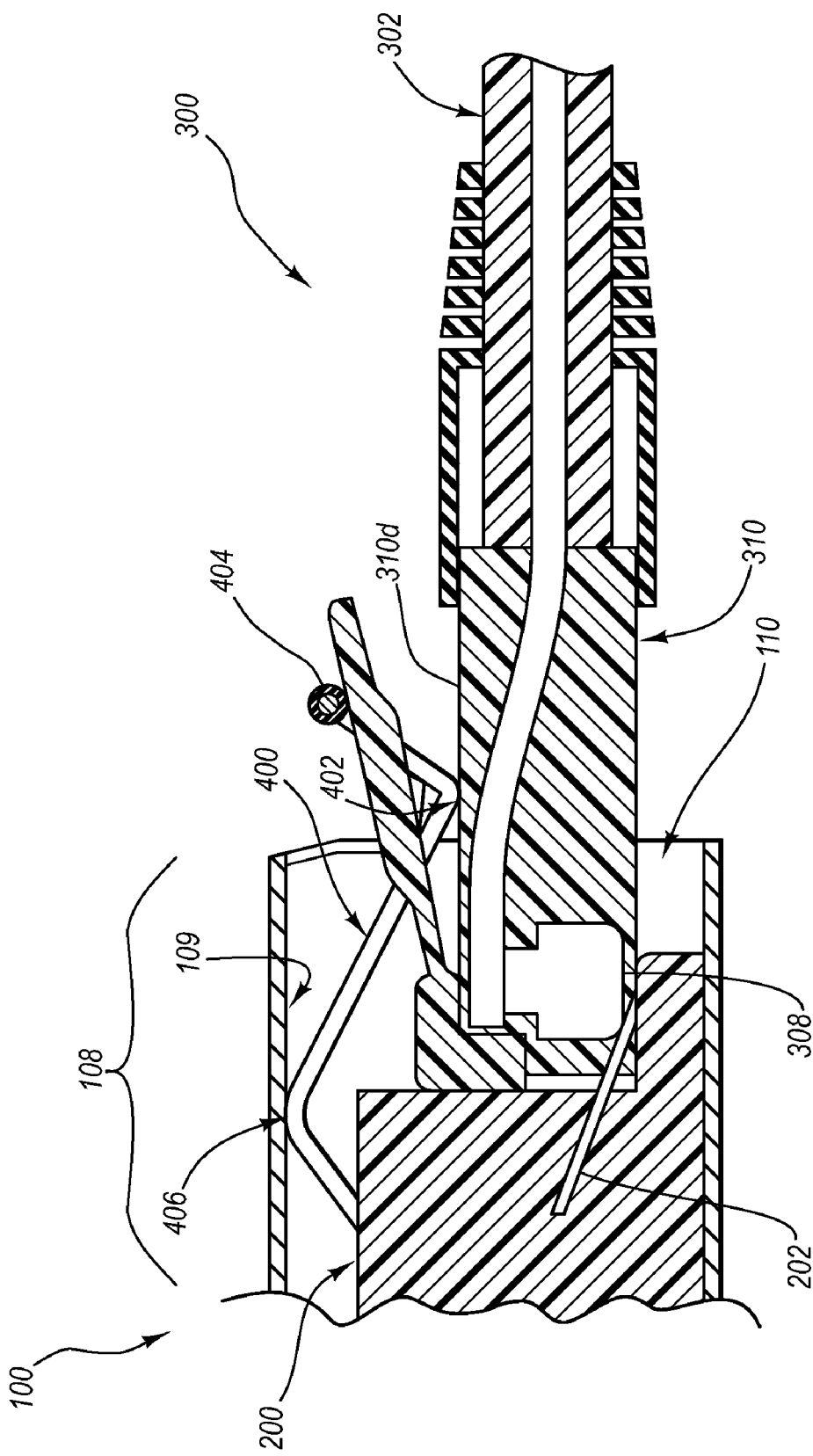
FIG. 5 is a partial cross-sectional view of the example transceiver module of FIG. 1 and the example shielded plug of FIGS. 3A and 3B.

With reference now to FIG. 5, a partial cross-section of the transceiver module 100 with the shielded plug 300 received in the jack 110 is disclosed. As disclosed in FIG. 5, when the bail 400 is assembled into the transceiver module 100, the curved portions 406 are disposed entirely within the connector portion 108 of the base 102. The bail 400 is positioned within the jack 110 in such a way that, in order for the shielded plug 300 to be inserted into the jack 110, the bail 400 must necessarily be in the "up" position, as disclosed in FIG. 5. This position of the bail 400 as shown in FIG. 5 is such that, when the shielded plug 300 is inserted into the jack 110, the contact points 402 of the bail 400 are biased against the top section 310d of the electrically conductive housing 310 of the shielded plug 300. This biasing of the contact points 402 of the bail 400 against the top section 310d of the shielded plug 300 creates a consistent and reliable electrical contact between the bail 400 and the electrically conductive housing 310 of the shielded plug 300.

As disclosed elsewhere herein, when the bail 400 is assembled into the transceiver module 100, portions of the bail 400 are in consistent and reliable electrical contact with the mounting plate 118. In addition, when the bail 400 is in the "up" position, a cam 408 of the bail 400 is biased against the pivot block 114, which creates a consistent and reliable electrical contact between the bail 400 and the pivot block 114. The pivot block 114 has a secure electrical contact to the mounting plate 118, the mounting plate 118 has a secure electrical contact to the base 102, the base 102 has a secure electrical contact to the housing 126, and the housing 126 has a secure electrical contact to chassis ground when the transceiver module 100 is plugged into a host device (not shown). Therefore, where the bail 400 is in the up position, the bail 400 necessarily has a consistent and reliable electrical contact with chassis ground through the chassis-grounded pivot block 114, mounting plate 118, base 102, and housing 126. Likewise, when the shielded plug 300 is inserted into the jack 110, the chassis-grounded bail 400 provides a reliable and consistent chassis ground contact to the electrically conductive housing 310 of the shielded plug 300 through the contact points 402 of the bail 400. In this way, a reliable ground path can be established between the host device and the shielded cable 302, via the transceiver module 100 and the shielded plug 300.

In addition to the chassis ground provided to the bail 400 through the chassis-grounded pivot block 114, mounting plate 118, base 102, and housing 126, the bail 400 can also be configured in one embodiment to establish an independent electrical contact between the bail 400 and any chassis-grounded component within the transceiver module 100. For example, as disclosed in FIG. 5, the bail 400 can be designed such that the curved portions 406 of the bail 400 make contact with an upper interior portion 109 of the connector portion 108 of the base 102 before the contact points 402 are raised high enough to fit the plug 300 into the jack 110. The subsequent acts of lifting the contact points 402 high enough to fit the shielded plug 300 into the jack 110 and inserting the shielded plug 300 into the jack 110 will have the effect of biasing the curved portions 406 against the upper interior portion 109 of the connector portion 108 of the base 102 and biasing the contact points 402 against the electrically conductive housing 310 of the shielded plug 300. In this manner, the curved portions 406 of the bail 400 are chassis grounded to the connector portion 108 of the base 102, and the electrically conductive housing 310 of the shielded plug 300 is in turn chassis grounded to the bail 400 at the contact points 402 of the bail 400.

The bail 400 therefore enhances the electrical robustness of the transceiver module 100 and provides for improved electrical characteristics thereof when used in conjunction with a shielded plug, such as the shielded plug 300.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transceiver module for use in a communications network, the transceiver module comprising:
    a housing operative to be electrically connected to chassis ground when the transceiver module is received within a host port;
    a jack defined in the housing and operative to receive a shielded plug; and
    a movable pivot lever operatively connected to a locking member, the pivot lever configured to allow removal of the transceiver module from within the host port, wherein movement of the pivot lever manipulates the locking member in a manner so as to enable the transceiver module to be removed from within the host port, and wherein the pivot lever is configured to be in direct contact and electrical contact with both the housing and a conductive element of the shielded plug received by the jack such that a chassis ground is established between the housing and the shielded plug.

2. The transceiver module as recited in claim 1, wherein the transceiver module substantially conforms to the SFP Transceiver MSA.

3. The transceiver module as recited in claim 1, wherein the transceiver module is configured to achieve data rates of about 1.25 Gb/s.

4. The transceiver module as recited in claim 1, wherein the transceiver module substantially supports the 1000Base-T transmission standard.

5. The transceiver module as recited in claim 1, wherein the transceiver module is configured to operate between about −40° C. and 85° C.

6. The transceiver module as recited in claim 1, wherein the jack substantially conforms to the RJ-45 standard.

7. The transceiver module as recited in claim 1, wherein the jack is operative to receive a shielded plug that substantially conforms to the RJ-45 standard.

8. The transceiver module as recited in claim 1, wherein the movable pivot lever comprises a wire bail.

9. The transceiver module as recited in claim 8, wherein the bail includes a plurality of contact points that are configured to bias against a shielded plug when the shielded plug is received by the jack.

10. The transceiver module as recited in claim 1, wherein the housing includes a locking recess which is sized and shaped to expose a lock pin of the locking member.

11. A transceiver module comprising:
    a housing comprising electrically conductive material;
    a jack defined in the housing, the jack being configured to receive a shielded plug; and
    a wire bail at least partially enclosed in the housing, the wire bail further configured to electrically connect with, and be in direct contact with, the housing and a conductive element of the shielded plug that is received within the jack.

12. The transceiver module as recited in claim 11, wherein the jack substantially conforms to the RJ-45 standard.

13. The transceiver module as recited in claim 11, wherein the wire bail includes a plurality of contact points that are configured to bias against a shielded plug when the shielded plug is received by the jack.

14. The transceiver module as recited in claim 11, wherein the transceiver module substantially conforms to the SFP Transceiver MSA.

15. A transceiver module comprising:
a housing comprising electrically conductive material;
a jack defined in the housing, the jack being configured to receive a shielded plug; and
a latch mechanism at least partially enclosed within the housing, the latch mechanism comprising:
a mounting plate electrically connected to the housing;
a pivot block pivotally and electrically connected to the mounting plate; and
a wire bail operatively and electrically connected to the pivot plate, the wire bail being configured to electrically connect with, and be in direct contact with, a conductive element of the shielded plug that is received within the jack.

16. The transceiver module as recited in claim 15, wherein the housing includes a locking recess which is sized and shaped to expose a lock pin of the pivot block when the latch mechanism is in a latched position.

17. The transceiver module as recited in claim 15, wherein the jack substantially conforms with the RJ-45 standard.

18. The transceiver module as recited in claim 15, wherein the transceiver module substantially conforms to the SFP Transceiver MSA.

* * * * *